US010552902B1

(12) United States Patent
Lockwood-Stein et al.

(10) Patent No.: US 10,552,902 B1
(45) Date of Patent: Feb. 4, 2020

(54) BEHAVIOR BASED DETERMINATION OF FINANCIAL TRANSACTION FAVORITES

(71) Applicant: Wells Fargo Bank, N.A., San Francisco, CA (US)

(72) Inventors: Margot Lockwood-Stein, Palo Alto, CA (US); Peter L. Shen, Castro Valley, CA (US); Amita Kheterpal, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/167,139

(22) Filed: Oct. 22, 2018

Related U.S. Application Data

(63) Continuation of application No. 15/079,155, filed on Mar. 24, 2016, now Pat. No. 10,176,522.

(51) Int. Cl.
G06Q 40/00 (2012.01)
G06Q 40/02 (2012.01)
G06Q 40/06 (2012.01)

(52) U.S. Cl.
CPC ............. G06Q 40/02 (2013.01); G06Q 40/06 (2013.01)

(58) Field of Classification Search
CPC .................................................... G06Q 40/02
USPC ............. 705/41, 14.25, 26.7, 39, 44, 35, 40
See application file for complete search history.

(56) References Cited

U.S. PATENT DOCUMENTS

| 8,611,867 B2 | 12/2013 | Swanburg et al. |
| 8,666,965 B2 | 3/2014 | Bennett |
| 9,049,547 B2 | 6/2015 | Ngo et al. |
| 2006/0020530 A1 | 1/2006 | Hsu et al. |
| 2010/0042953 A1 | 2/2010 | Stewart et al. |
| 2010/0217701 A1* | 8/2010 | Mesilaty ................ G06Q 40/00 705/35 |
| 2010/0325048 A1* | 12/2010 | Carlson .................. G06Q 20/20 705/44 |
| 2011/0107265 A1 | 5/2011 | Buchanan et al. |
| 2013/0339234 A1* | 12/2013 | Prakash ................ G06Q 20/12 705/41 |
| 2014/0012648 A1 | 1/2014 | Grimes |
| 2014/0012745 A1* | 1/2014 | Hanson ................ G06Q 20/102 705/40 |
| 2014/0074649 A1* | 3/2014 | Patel .................. G06Q 30/0631 705/26.7 |

(Continued)

FOREIGN PATENT DOCUMENTS

WO 20010167214 A2 9/2001

OTHER PUBLICATIONS

Prosecution History from U.S. Appl. No. 15/079,155, dated Mar. 29, 2018 through Aug. 31, 2018, 35 pp.

Primary Examiner — Samica L Norman
(74) Attorney, Agent, or Firm — Shumaker & Sieffert, P.A.

(57) ABSTRACT

Techniques are described for monitoring a plurality of financial transactions of a customer performed across a plurality of financial accounts. The techniques may include determining a subset of the plurality of financial transactions based on a first metric applied to the plurality of financial transactions. The techniques may further include identifying a suggested financial transaction based on a second metric applied to the subset of the plurality of financial transactions. The techniques may further include presenting the suggested financial transaction to the customer via a user interface associated with at least one of the plurality of financial accounts.

20 Claims, 11 Drawing Sheets

(56) References Cited

U.S. PATENT DOCUMENTS

| | | | |
|---|---|---|---|
| 2014/0164224 A1* | 6/2014 | Grigg | G06Q 40/02 705/39 |
| 2014/0222662 A1 | 8/2014 | Bierwas et al. | |
| 2014/0236695 A1* | 8/2014 | Shvarts | G06Q 30/0224 705/14.25 |
| 2014/0337801 A1 | 11/2014 | Wang et al. | |
| 2015/0058124 A1 | 2/2015 | Sethi | |
| 2016/0155102 A1* | 6/2016 | Serrano | G06Q 20/32 705/39 |
| 2016/0371780 A1* | 12/2016 | Barratt | G06Q 40/06 |

* cited by examiner

| | DATE | TRANSFERRING ACCOUNT | RECEIVING ACCOUNT | AMOUNT |
|---|---|---|---|---|
| 300 | | | | |
| 302 | 1/1/2016 | CHECKING | CD | $ 75.00 |
| 304 | 1/5/2016 | CHECKING | BROKERAGE | $ 1,000.00 |
| 306 | 1/7/2016 | CHECKING | CD | $ 225.00 |
| 308 | 1/7/2016 | SAVINGS | CD | $ 1,000.00 |
| 310 | 1/9/2016 | CREDIT | FOREIGN CURRENCY | $ 2,000.00 |
| 312 | 1/9/2016 | SAVINGS | HOME EQUITY | $ 30,000.00 |
| 314 | 1/16/2016 | SAVINGS | BROKERAGE | $ 2,500.00 |
| 316 | 1/29/2016 | CHECKING | SAVINGS | $ 480.00 |
| 318 | 2/5/2016 | CHECKING | BROKERAGE | $ 1,000.00 |
| 320 | 2/17/2016 | CHECKING | SAVINGS | $ 420.00 |
| 322 | 2/20/2016 | SAVINGS | CHECKING | $ 3,500.00 |
| 324 | 2/23/2016 | CHECKING | CREDIT | $ 1,250.00 |
| 326 | 2/23/2016 | CHECKING | CD | $ 90.00 |
| 328 | 3/3/2016 | CHECKING | SAVINGS | $ 315.00 |
| 330 | 3/5/2016 | CHECKING | BROKERAGE | $ 1,000.00 |
| 332 | 3/7/2016 | CHECKING | CREDIT | $ 750.00 |
| 334 | 3/18/2016 | CHECKING | SAVINGS | $ 155.00 |
| 336 | 3/18/2016 | SAVINGS | FOREIGN CURRENCY | $ 2,700.00 |
| 338 | 4/1/2016 | SAVINGS | CREDIT | $ 1,800.00 |
| 340 | 4/5/2016 | CHECKING | BROKERAGE | $ 1,000.00 |
| 342 | 4/6/2016 | CHECKING | CD | $ 1,300.00 |
| 344 | 4/10/2016 | CHECKING | SAVINGS | $ 450.00 |
| 346 | 4/29/2016 | CHECKING | SAVINGS | $ 457.00 |
| 348 | 5/2/2016 | CHECKING | SAVINGS | $ 189.00 |
| 350 | 5/5/2016 | CHECKING | BROKERAGE | $ 1,000.00 |

FIG. 3

| 400 | DATE | TRANSFERRING ACCOUNT | RECEIVING ACCOUNT | AMOUNT |
|---|---|---|---|---|
| 402 | 1/29/2016 | CHECKING | SAVINGS | $ 480.00 |
| 404 | 2/17/2016 | CHECKING | SAVINGS | $ 420.00 |
| 406 | 3/3/2016 | CHECKING | SAVINGS | $ 315.00 |
| 408 | 3/18/2016 | CHECKING | SAVINGS | $ 155.00 |
| 410 | 4/10/2016 | CHECKING | SAVINGS | $ 450.00 |
| 412 | 4/29/2016 | CHECKING | SAVINGS | $ 457.00 |
| 414 | 5/2/2016 | CHECKING | SAVINGS | $ 189.00 |
| 416 | 1/5/2016 | CHECKING | BROKERAGE | $ 1,000.00 |
| 418 | 2/5/2016 | CHECKING | BROKERAGE | $ 1,000.00 |
| 420 | 3/5/2016 | CHECKING | BROKERAGE | $ 1,000.00 |
| 422 | 4/5/2016 | CHECKING | BROKERAGE | $ 1,000.00 |
| 424 | 5/5/2016 | CHECKING | BROKERAGE | $ 1,000.00 |
| 426 | 2/23/2016 | CHECKING | CREDIT | $ 1,250.00 |
| 428 | 3/7/2016 | CHECKING | CREDIT | $ 750.00 |
| 430 | 1/1/2016 | CHECKING | CD | $ 75.00 |
| 432 | 1/7/2016 | CHECKING | CD | $ 225.00 |
| 434 | 2/23/2016 | CHECKING | CD | $ 90.00 |
| 436 | 4/6/2016 | CHECKING | CD | $ 1,300.00 |
| 438 | 1/9/2016 | CREDIT | FOREIGN CURRENCY | $ 2,000.00 |
| 440 | 1/16/2016 | SAVINGS | BROKERAGE | $ 2,500.00 |
| 442 | 1/7/2016 | SAVINGS | CD | $ 1,000.00 |
| 444 | 2/20/2016 | SAVINGS | CHECKING | $ 3,500.00 |
| 446 | 4/1/2016 | SAVINGS | CREDIT | $ 1,800.00 |
| 448 | 3/18/2016 | SAVINGS | FOREIGN CURRENCY | $ 2,700.00 |
| 450 | 1/9/2016 | SAVINGS | HOME EQUITY | $ 30,000.00 |

FIG. 4

| | TRANSFERRING ACCOUNT | RECEIVING ACCOUNT | ACCT FREQUENCY |
|---|---|---|---|
| 500 | | | |
| 502 | CHECKING | SAVINGS | 7 |
| 504 | CHECKING | BROKERAGE | 5 |
| 506 | CHECKING | CREDIT | 2 |
| 508 | CHECKING | CD | 4 |
| 510 | CREDIT | FOREIGN CURRENCY | 1 |
| 512 | SAVINGS | BROKERAGE | 1 |
| 514 | SAVINGS | CD | 1 |
| 516 | SAVINGS | CHECKING | 1 |
| 518 | SAVINGS | CREDIT | 1 |
| 520 | SAVINGS | FOREIGN CURRENCY | 1 |
| 522 | SAVINGS | HOME EQUITY | 1 |

FIG. 5

| 600 | TRANSFERRING ACCOUNT | RECEIVING ACCOUNT | AMOUNT | AMOUNT FREQUENCY |
|---|---|---|---|---|
| 602 | CHECKING | BROKERAGE | $ 1,000.00 | 5 |
| 604 | CHECKING | CD | $ 1,300.00 | 1 |
| 606 | CHECKING | CD | $ 225.00 | 1 |
| 608 | CHECKING | CD | $ 90.00 | 1 |
| 610 | CHECKING | CD | $ 75.00 | 1 |
| 612 | CHECKING | CREDIT | $ 1,250.00 | 1 |
| 614 | CHECKING | CREDIT | $ 750.00 | 1 |
| 616 | CHECKING | SAVINGS | $ 480.00 | 1 |
| 618 | CHECKING | SAVINGS | $ 457.00 | 1 |
| 620 | CHECKING | SAVINGS | $ 450.00 | 1 |
| 622 | CHECKING | SAVINGS | $ 420.00 | 1 |
| 624 | CHECKING | SAVINGS | $ 315.00 | 1 |
| 626 | CHECKING | SAVINGS | $ 189.00 | 1 |
| 628 | CHECKING | SAVINGS | $ 155.00 | 1 |
| 630 | CREDIT | FOREIGN CURRENCY | $ 2,000.00 | 1 |
| 632 | SAVINGS | BROKERAGE | $ 2,500.00 | 1 |
| 634 | SAVINGS | CD | $ 1,000.00 | 1 |
| 636 | SAVINGS | CHECKING | $ 3,500.00 | 1 |
| 638 | SAVINGS | CREDIT | $ 1,800.00 | 1 |
| 640 | SAVINGS | FOREIGN CURRENCY | $ 2,700.00 | 1 |
| 642 | SAVINGS | HOME EQUITY | $ 30,000.00 | 1 |

FIG. 6

BEHAVIOR BASED DETERMINATION OF FINANCIAL TRANSACTION FAVORITES

This application is a continuation of U.S. application Ser. No. 15/079,155, entitled "BEHAVIOR BASED DETERMINATION OF FINANCIAL TRANSACTION FAVORITES," filed on Mar. 24, 2016, the entire content of which is incorporated herein by this reference.

TECHNICAL FIELD

This disclosure relates to tracking financial transaction data.

BACKGROUND

Computing systems and databases are becoming increasingly popular as mechanisms by which customers access personal and business-related financial information at various financial institutions. As an example, online banking systems provide interactive interfaces through which customers may view financial information or perform various financial transactions. For example, a financial institution may provide services that allow customers to electronically deposit funds into an account, transfer funds between accounts, invest funds, and transact payments to other parties.

Electronic transactions of funds may be faster, more convenient, and more secure than via other methods of financial transactions. In one example, a payer may use software to specify a payee and an amount of money to transfer to the payee, and the financial institution may transact the payment of specified amount of money from a financial account associated with the payer to a financial account associated with the payee. In another example, an account holder may use software to deposit funds into or withdraw funds from one or more accounts, or to transfer funds between two or more accounts. In a further example, an investor may use software to purchase, sell, or manage invested funds. This software may be accessed through an automated teller machine (ATM), a web browser running on a computing device, such as a desktop or laptop computer, or an application running on a mobile device, such as a smartphone.

SUMMARY

In general, the disclosure describes techniques for providing suggested financial transactions to a customer of an online banking service based on the financial transactions the customer performs most frequently. The techniques include monitoring the financial transactions performed by a customer across a plurality of financial accounts. The plurality of financial accounts may include a number of different financial accounts, such as checking accounts, savings accounts, brokerage accounts, credit accounts, retirement savings accounts, and the like. These financial systems may be accessible through an automated teller machine (ATM), a web browser running on a computing device, such as a desktop or laptop computer, or an application running on a mobile device, such as a smartphone.

The techniques described in this disclosure further include determining a subset of the financial transactions performed across the plurality of financial accounts based on a first metric applied to the financial transactions. In some examples, the first metric may be a determination of a predetermined number of past transactions, the financial transactions performed over a predetermined period of time, between particular financial accounts, or based on some other metric. The system may identify one or more "favorite" financial transactions of the customer based on a second metric applied to the subset of the plurality of financial transactions. In one example, the second metric may include analyzing the financial transactions performed the most frequently. In some examples, the second metric may be a determination of the most frequently performed transaction or the most recent transaction. Based on the analysis, the online banking service may present to the customer one or more suggested "favorite" financial transactions via a user interface. The "favorite" financial transactions may identify at least one of the different financial accounts associated with the financial transaction and, in some cases, a financial transaction amount. If the customer selects to perform one of the suggested financial transactions, the online banking service may automatically complete a number of the fields required to perform the transaction. In this way, the techniques may reduce the amount of time required for a customer to complete their favorite financial transactions.

In one example, this disclosure describes a method including monitoring, by one or more processors, a plurality of financial transactions performed by a customer within a plurality of financial accounts; determining, by the one or more processors, a subset of the plurality of financial transactions based on a first metric applied to the plurality of financial transactions; identifying, by the one or more processors, at least one suggested financial transaction based on a second metric applied to the subset of the plurality of financial transactions; and presenting, by the one or more processors, the at least one suggested financial transaction to the customer via a user interface associated with at least one of the plurality of financial accounts.

In a further example, this disclosure describes a computer system including one or more processors, wherein the one or more processors are configured to monitor a plurality of financial transactions performed by a customer within a plurality of financial accounts; determine a subset of the plurality of financial transactions based on a first metric applied to the plurality of financial transactions; identify at least one suggested financial transaction based on a second metric applied to the subset of the plurality of financial transactions; and present the at least one suggested financial transaction to the customer via a user interface associated with at least one of the plurality of financial accounts.

In a further example, this disclosure describes a computer-readable medium including instructions for causing at least one programmable processor to monitor a plurality of financial transactions performed by a customer within a plurality of financial accounts; determine a subset of the plurality of financial transactions based on a first metric applied to the plurality of financial transactions; identify at least one suggested financial transaction based on a second metric applied to the subset of the plurality of financial transactions; and present the at least one suggested financial transaction to the customer via a user interface associated with at least one of the plurality of financial accounts.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3 is a table illustrating an example plurality of financial transactions according to the techniques of the disclosure.

FIG. 4 is a table illustrating an example plurality of financial transactions according to the techniques of the disclosure.

FIG. 5 is a table illustrating examples of frequent financial transactions according to the techniques of the disclosure.

FIG. 6 is a table illustrating examples of frequent financial transactions according to the techniques of the disclosure.

DETAILED DESCRIPTION

Figure 1:
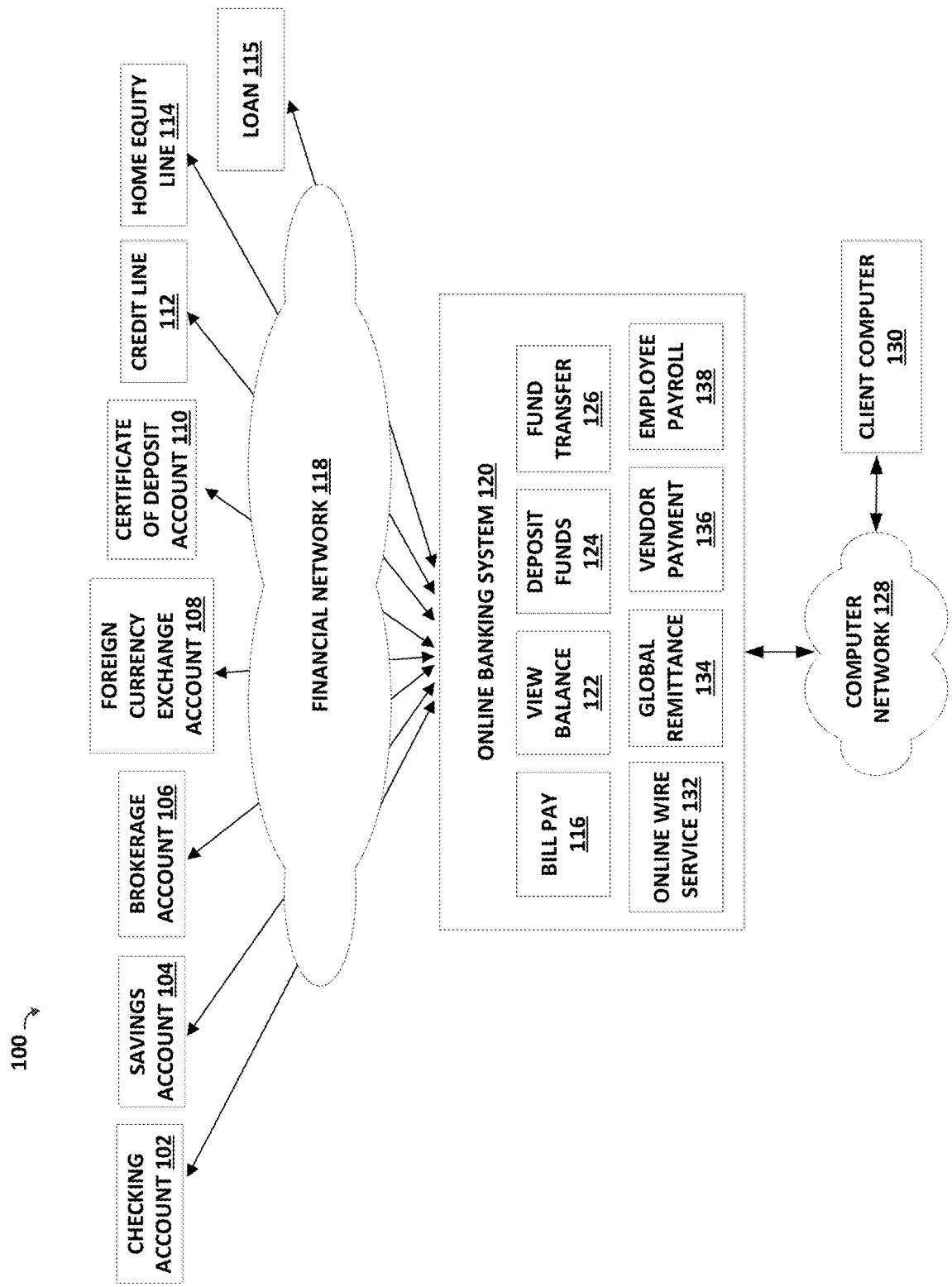
FIG. 1 is a block diagram illustrating an example financial system that includes an online banking system configured to determine behavior based financial transaction favorites according to the techniques of the disclosure.

A financial institution may provide customers with access to an online banking system through a user interface of an automated teller machine (ATM), a web browser running on a computing device, such as a desktop or laptop computer, or an application running on a mobile device, such as a smartphone. The online banking system may allow a customer to view details regarding various financial accounts of the customer as well as perform various types of financial transactions. For example, a customer of a financial institution may view the balance of their checking or savings accounts, pay bills, invest funds from a checking or savings account into a brokerage or retirement savings account, or transfer funds between a checking account and a savings account. Throughout this disclosure, the terms "customer" and "user" may be used interchangeably.

As one example financial transaction, a customer may select an option in the user interface to begin a transfer of funds. The user interface may prompt the customer to specify an amount to be transferred, a transferring account, and a recipient account. The user interface may present the customer with the details of the transaction and prompt the customer to authorize the completion of the transaction. The user interface may execute the transaction and present the customer with a receipt confirming the success of the transaction.

In general, it can be observed that many customers frequently perform the same financial transactions. In other words, while a customer may perform many types of transactions, one or more transactions generally exist that the customer performs more frequently than other types of transactions. For example, an individual may put a certain amount of money in his savings account each week. Similarly, a business may pay rent for a building each month. Conventionally, for each transaction, the customer may be required to perform the entire process of selecting an option in the user interface to begin a transfer of funds; receiving a prompt to specify an amount to be transferred, a transferring account, and a recipient account; receiving the details of the transaction; authorizing the completion of the transaction; and receiving a receipt confirming the success of the transaction upon the successful execution of the transaction. This procedure may be time consuming and inefficient in the case where the customer performs the same transaction on a repeated basis.

In one example, this disclosure describes techniques for analyzing the financial transactions performed across a plurality of financial systems based on a first applied metric to identify a subset of the plurality of financial transactions for further analysis. In some examples, the first metric may be the financial transactions performed over a predetermined number of past transactions, over a predetermined period of time, or between particular financial accounts. The system may further identify a suggested financial transaction based on a second metric applied to the subset of the plurality of financial transactions. In some examples, the second metric may be a determination of the financial transaction or transactions that the customer performs the most frequently. In other examples, the second metric may be a determination of the last or most recent financial transaction that the user has performed. Based on the analysis, the online banking service may suggest to the customer one or more "favorite" financial transactions via a user interface. The favorite financial transactions may identify at least one of the different financial accounts associated with the financial transaction and, in some cases, a financial transaction amount. If the customer selects to perform one of the suggested financial transactions, the online banking service may automatically complete a number of the fields required to perform the transaction. In this way, the techniques may reduce the amount of time required for a customer to complete their favorite financial transactions.

A customer may possess a plurality of financial accounts with a financial institution. The financial institution may provide the customer with access to the plurality of financial accounts through an online banking system, which the customer may access through a user interface of an ATM, a web browser running on a computing device, such as a desktop or laptop computer, or an application running on a mobile device, such as a smartphone. In some examples, the customer may use the online banking system to view the balance of each of the plurality of financial accounts, transfer funds from one account to another, pay bills, or deposit additional funds.

In some examples, the financial institution may offer a plurality of different types of financial accounts to its customers. In some examples, the financial accounts may include a checking account or savings account that the customer possesses with the financial institution. In other examples, the financial accounts may include a brokerage account through which a customer may conduct transactions related to acquiring and disposing of stocks, bonds, and other financial instruments. In some examples, the financial accounts may include a foreign currency exchange account through which a customer may convert funds of a first currency into funds of a second currency. In some examples, the financial accounts may include a certificate of deposit ("CD") account that a customer possesses with the financial institution. In some examples, the financial accounts may include a line of personal credit, or a line of home equity credit that the customer possesses with the financial institution. In some examples, the financial accounts may include one or more retirement savings accounts that the customer possesses with the financial institution. In further examples, the financial accounts may include one or more loans, such as personal, auto, student, or mortgage loans, that a customer carries through the financial institution. The techniques of this disclosure may be applied to any type of account a customer may hold with a financial institution.

In some examples, the online banking system may include one or more services, such as a bill pay service that allows a customer to pay bills, such as the customer's utility, electric, heating, rent, or other types of bills, through the online banking system. In additional to the bill pay service, the online banking system may include a fund transfer service. The fund transfer service may allow the customer to transfer funds between different accounts that are either held internally by the financial institution, between accounts external to the financial system, or for person-to-person transactions. The online banking system may also include a view balance service that allows the customer to quickly view a current balance in a given account, and a deposit service that allows the customer to deposit funds into a given account. The online banking system may also include an online wire service that allows the customer to wire funds to domestic or international accounts at other banks. The online banking system may also include a global remittance service that allows the customer to transfer funds in different currencies to individuals located in different countries. The online banking system may also include a vendor payment service that allows the customer to pay invoices and debts to vendors in exchange for services rendered. The online banking system may also include an employee payroll service that allows an employer to pay employees by transferring money from a payroll account to the employee's direct deposit account.

A customer may use the online banking system to perform a transaction, such as to transfer funds from a first account he holds with the financial institution to a second account he holds with the financial institution. In some examples, to complete a transfer, the customer must select: a transferring account, from which the funds will be transferred; a receiving account, which will receive the transferred funds; an amount of funds to be transferred; and a date upon which to execute the transaction. In other examples, a customer may conduct a transaction by depositing or withdrawing funds to a single account. In this example, the customer may select a particular account, whether to withdraw or deposit funds, and the amount of the transaction.

A customer may perform many transactions through the online banking system. However, in some examples, the customer may perform one or more particular transactions more frequently than the others. For example, once a month, a customer may transfer $100 from his checking account into his savings account. In another example, every two weeks, a customer may make a $1,000 payment on a personal loan held through the financial institution by transferring money from his savings account. In another example, every Monday, the customer may pay his personal bills by transferring funds from his checking account using the Bill Pay feature of the online banking system.

While in the foregoing examples, the customer may periodically conduct the same transaction, the techniques of this disclosure broadly apply to any frequently performed transactions regardless of whether they fall on a periodic schedule. For example, a customer may be visiting a foreign country, such as England. He may convert $300 in American dollars into British pounds by transferring funds from his checking account to a foreign currency exchange account. The customer may perform this transaction a dozen intermittent times during his visit to England whenever he needs spending money.

Conventional online banking systems are not capable of tracking customer behavior across multiple different financial accounts and, thus, do not "learn" the customer's habits of fund management between the accounts. In conventional online banking systems, therefore, the customer may be forced to input every detail of each transaction, regardless of how often the customer performs the particular transaction. The need for the customer to enter the same details for the same transactions, over and over again may waste the customer's time and degrade the customer's overall experience.

According to the techniques of the disclosure, an online banking system is configured to monitor a plurality of financial transactions performed by the customer across a plurality of financial accounts. The online banking system may apply a first metric to create a subset of the plurality of financial transactions for further analysis. The online banking system may apply a second metric to the subset of financial transactions to determine which transactions are performed most frequently by the customer, or which have been performed last. Based on these metrics, the online banking system may determine one or more suggested transactions. In some examples, when the customer accesses the online banking system, the system may present to the customer one or more of these suggested transactions for selection via a user interface. In some examples, when the customer selects one of the presented transactions, the system may automatically complete a majority of the required input fields for the selected transaction, and only require the customer to approve the selected transaction for completion. In this way, the online banking system of the present disclosure may track the behavior of a customer to identify the transactions having the highest frequency of occurrence or recently performed transactions, i.e., his "favorite" financial transactions, and suggest the favorite financial transactions to the customer such that only minimum interaction by the customer is required to complete them. In some examples, the suggested financial transaction may be the financial transaction or transactions having the highest frequency of occurrence. In some examples, the suggested financial transaction may be the last or most recent financial transaction that the user has performed. Accordingly, the online banking system of the present disclosure may decrease the time required by a customer to perform his most frequently performed transactions. Further, the online banking system of the present disclosure may enhance the experience of the customer due to the personalization of the online banking system to the customer.

FIG. 1 is a block diagram illustrating an example financial system 100 that includes an online banking system 120 configured to determine behavior based financial transaction favorites according to the techniques of the disclosure. In the example of FIG. 1, a financial institution may provide online banking system 120 to a customer (e.g., via client computer 130) so that the customer may access a plurality of financial accounts 102-115 that he holds with the financial institution. According to the techniques of the disclosure, online banking system 120 may monitor the behavior of a customer across all or a plurality of the financial accounts. Online banking system 120 may identify the transactions performed by the customer most frequently and suggest one or more of the transactions having the highest frequency of occurrence or most recent transactions to the customer for potential selection and performance. In some examples, once online banking system 120 has received approval from the customer to perform the most frequent transactions, online banking system 120 may automatically complete any necessary information required to execute the transactions.

Online banking system 120 may access the financial accounts 102-115 held by the customer through financial network 118. In some examples, a customer may hold a checking account 102 with the financial institution. The customer may use checking account 102 as a deposit account available to the customer "on demand" for frequent and immediate access by customer. The customer may also hold a savings account 104 with the financial institution. The customer may use savings account 104 to set aside a portion of the liquid assets of the customer while earning interest on the funds within the account. The customer may also hold a brokerage account 106 with the financial institution. The customer may use brokerage account 106 to deposit funds with the financial institution and place investment orders through the financial institution, operating as a broker, which then carries out the transactions on the investor's behalf. The customer may also hold a foreign currency exchange account 108 with the financial institution. The customer may use foreign currency exchange account 108 to maintain funds in a U.S. or overseas bank in a foreign currency (e.g., where the funds are maintained in British pounds, as opposed to U.S. dollars). The customer may hold a certificate of deposit (CD) account 110 with the financial institution. The customer may use CD account 110 to deposit funds at a fixed interest for a specific, fixed length of time. The customer may also hold a personal credit line 112 or a home equity line 114, in which the financial institution has previously agreed to lend the customer a certain amount of money. The customer may also hold one or more loans 115, through which the customer has received a loan of money and may make scheduled or unscheduled payments to that loan. The loan may be of many different types, such as a personal loan, automobile loan, student loan, business loan, mortgage loan, or cash advance.

In the illustrated example, each of financial accounts 102-115 may be with the same financial institution. In other examples, one or more of the financial accounts 102-115 may be an account that is held external to the financial institution. In either case, each of financial accounts 102-115 may have a separate database or other storage system in which account and transaction information is stored. In some examples, each of the separate databases or storage systems for financial accounts 102-115 may be held in servers that are hosted in geographically remote locations from each other.

In some examples, the customer may possess one or more accounts of each type 102-115 illustrated in FIG. 1. In other examples, the customer may possess one, several, or none of each type of account described herein, or may possess accounts of a different type altogether. For example, the techniques of the disclosure may be applied to a customer possessing one checking account, three savings accounts, and no brokerage account or lines of credit. In a further example, the techniques of the disclosure may be applied to a customer having a brokerage account and two checking accounts, and no other accounts.

The customer may have access to one or more services provided by online banking system 120. For example, online banking system may provide a bill pay feature 116, wherein the financial institution may allow the customer to pay bills or transfer money to accounts outside of the financial institution (e.g., to accounts within other banks). In other examples, online banking system 120 may provide other services, such as a view balance service 122, a deposit funds service 124, and a fund transfer service 126. In still further examples, online banking system 120 may provide services such as an online wire service 132, a global remittance service 134, a vendor payment service 136, and an employee payroll service 138. In further examples, online banking system 120 may provide more, less, or different services than those illustrated in FIG. 1.

A customer may use a client computer 130 to access online banking system 120 through a computer system 128. The customer may then use the one or more services provided by online banking system 120 to conduct various operations on his financial accounts. For example, the customer may view the balance of each account, view banking statements, deposit funds into a given account, pay a bill from a given account, and transfer funds from one account to another. In some examples, client computer 130 may comprise a personal computing device, such as a desktop computer, a laptop computer, a tablet computer, a "smart" phone or "smart" pad, or another mobile device. In other examples, client computer 130 may comprise an ATM or a customer terminal at a brick-and-mortar bank location.

Computer system 128 may comprise a private network or a public network, such as the Internet, through which the customer is able to access online banking system 120. In some examples, computer system 128 may comprise a local area network, a wide-area network, a telecommunications system, or a cellular phone network. Online banking system 120, in turn, may access one or more of accounts 102-115 held by the customer with the financial institution through financial network 118. Financial network 118 may be a private network, such as a virtual private network (VPN), maintained by the financial institution in order to provide secure access to accounts 102-115. For example, the customer may need to enter a username and password or other credentials to access online banking system 120 and accounts 102-115. In some examples, financial network 118 may be a local area network at a single geographic location of the financial institution. In other examples, financial network 118 may be a wide-area network used to connect several remote locations of the financial institution.

According to the techniques of this disclosure, online banking system 120 may monitor the behavior of the customer across all or a plurality of the financial accounts 102-115. As discussed above, each of financial accounts 102-115 may have a separate database or other storage system in which account and transaction information is stored. Monitoring the customer's behavior, therefore, may include reading or pulling information from each of the separate databases for the plurality of financial accounts held by the customer. As described in more detail below with respect to FIG. 2, online banking system 120 may identify at least one "favorite" financial transaction performed by the customer based on the monitored information. In one example, by monitoring the customer's behavior across all financial accounts 102-115, online banking system 120 may identify the most frequent transactions performed by the customer. In another example, by monitoring the customer's behavior across all financial accounts 102-115, online banking system 120 may identify the most recent transaction performed by the customer.

In further accordance with the disclosed techniques, when the customer accesses online banking system 120, the system 120 may present the customer with a suggestion for the customer to perform the at least one favorite financial transaction. In the case where the customer selects to perform the at least one favorite financial transaction, e.g., the transactions having the highest frequency of occurrence or the most recently performed transaction, the system 120 may automatically populate the accounts associated with the suggested transaction. In some examples, the system 120 may also automatically populate a transaction amount. For example, the system 120 may automatically populate all details required to complete the suggested transaction and only query the customer for approval to complete the transaction. In other examples, the system 120 may automatically populate the accounts associated with the suggested transaction, but query the customer to enter or edit a transaction amount prior to completing the transaction.

Thus, it may be seen that a system according to the techniques of the disclosure may assist a customer by anticipating the "favorite" transactions executed by the customer, and automatically populating the information needed to perform these transactions. Such a system may reduce the amount of time required for a customer to perform his favorite financial transactions. Further, such a system may provide a customer with a more personalized experience than conventional online banking systems.

The techniques of the disclosure may be applied to many types of transactions that a customer may perform at a financial institution. For example, the techniques of the disclosure may be applied to transfers of funds between accounts (i.e., from checking to savings), deposits and withdrawals to an account (i.e., such as depositing cash, a check, or a money order), wiring money to a third-party account, purchasing or selling interests in securities, stocks, and bonds, paying debts, bills, credit card payments, and loans, and many other types of financial transactions not enumerated here.

Figure 2:
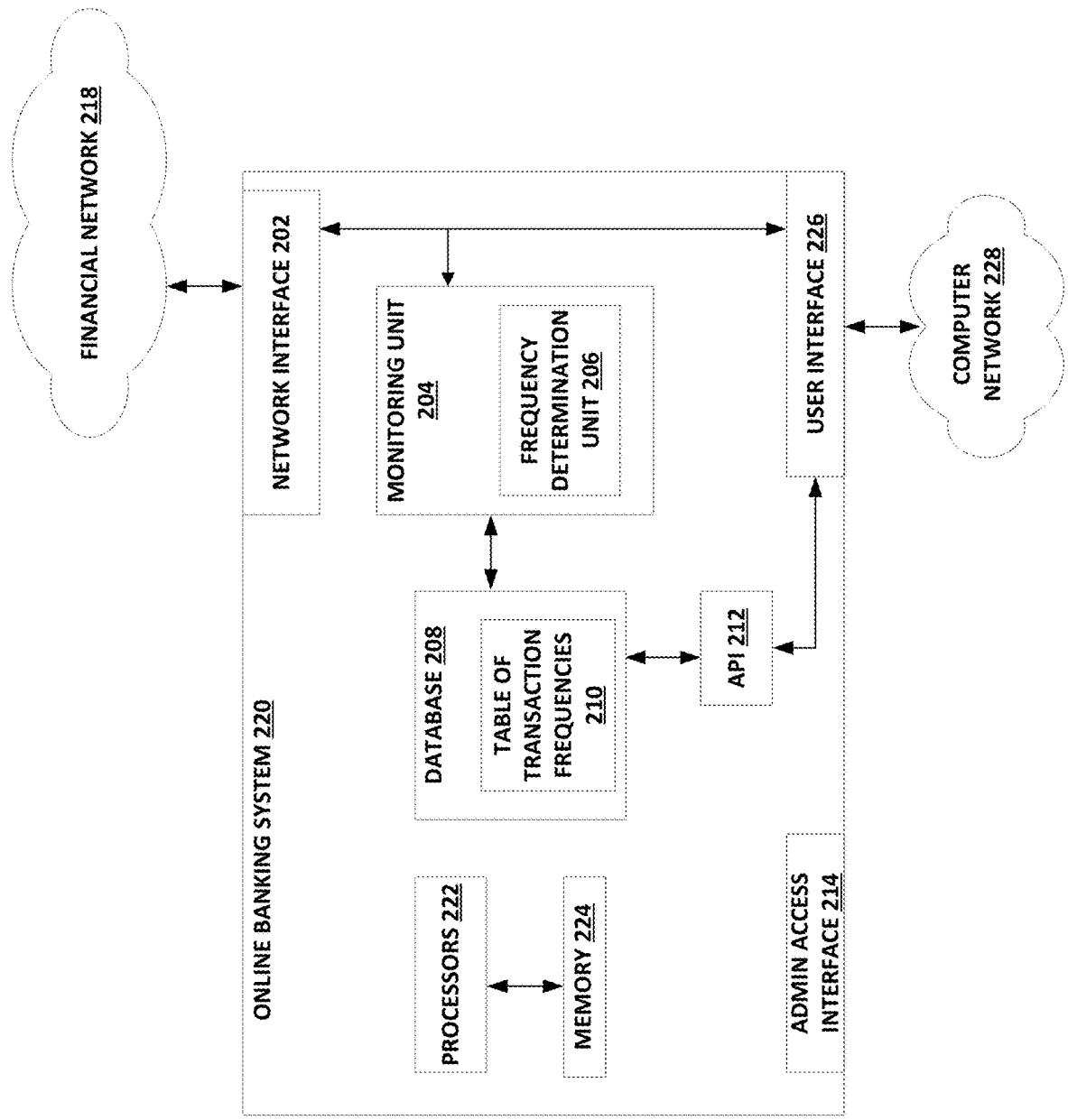
FIG. 2 is a block diagram illustrating another example online banking system configured to determine behavior based financial transaction favorites according to the techniques of the disclosure.

FIG. 2 is a block diagram illustrating another example online banking system configured to determine behavior based financial transaction favorites according to the techniques of the disclosure. In general, online banking system 220 may operate substantially similar to online banking system 120 of FIG. 1. In this example, online banking system 220 includes user interface 226 to communicate with a customer of the online banking system across computer system 228. Online banking system 220 may interface with financial network 218 through network interface 202 and may facilitate financial transactions between the customer and financial network 218. In general, financial network 218 may operate substantially similar to financial network 112 and may include a plurality of financial accounts and services.

In some examples, online banking system 220 may include one or more processors 222, such as microprocessors, digital signal processors (DSPs), application specific integrated circuits (ASICs), field programmable gate arrays (FPGAs), or any other equivalent integrated or discrete logic circuitry, as well as any combinations of such components. Further, online banking system 220 may include memory 224, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Further, this memory may be implanted entirely in hardware, software, or a combination thereof.

In some examples, the one or more processors 222 and memory 224 of online banking system 220 may implement the features of online banking system 220 on a single computer. In other examples, one or more processors 222 and memory 224 of online banking system 220 may be distributed across a network of computers which collectively implement the features of online banking system 220.

According to the techniques of the disclosure, online banking system 220 may include monitoring unit 204. In some examples, monitoring unit 204 may be implemented as a hardware unit of online banking system 220. In other examples, monitoring unit 204 may be implemented as a software algorithm stored in memory 224 and executed by one or more hardware processors 222. Monitoring unit 204 may monitor transactions performed by customers of online banking system 220. For example, monitoring unit 204 may monitor each of a plurality of financial transactions performed by a customer via online banking system 220 by tracking one or more accounts associated with each of the financial transactions as well as a transaction amount.

As described above with respect to FIG. 1, a customer or customer may hold numerous accounts with the financial institution. For example, the customer may hold one or more of each of accounts 102-115. Each of financial accounts 102-115 may have a separate database or other storage system in which account and transaction information is stored. According to the disclosed techniques, monitoring unit 204 of online banking system 220 is configured to monitor the customer's transactions across all of the accounts held by the customer. In this way, monitoring unit 204 may, for example, track deposits into any of the accounts held by the customer, withdrawals or bill pay from any of the accounts held by the customer, and fund transfers between any of the accounts held by the customer.

In order to monitor the customer's transactions, monitoring unit 204 may need to access and then read or pull transaction information from each of the separate databases for the plurality of financial accounts held by the customer. In the example illustrated in FIG. 2, monitoring unit 204 may access the financial accounts and their associated databases via network interface 202 and financial network 218. According to the disclosed techniques, monitoring unit 204 is configured to handle large amounts of data from multiple different sources. In some examples, monitoring unit 204 may be configured to pull data regarding the transactions according to a first metric or methodology. For example, monitoring unit 204 may be configured to pull transaction information from each of the different accounts for a predetermined period of time (e.g., over a week, a month, or a year). In another example, monitoring unit 204 may be configured to pull transaction information from each of the different accounts for predetermined number of previous transactions. In other examples, monitoring unit 204 may be configured to pull transaction information associated with specified financial accounts. For example, monitoring unit 204 may pull information only for transactions that occur between a first account and a second account. In this way, monitoring unit 204 may separately monitor or track specific types of transactions, e.g., fund transfers from checking account 102 to brokerage account 106. In this way, monitoring unit 204 may be able to limit or refine the amount of data pulled for each of the financial accounts.

Online banking system 220 may apply a second metric to information describing a plurality of transactions to determine a suggested transaction. In the example of FIG. 2, the second metric applied is a determination of the most frequently occurring financial transactions. As illustrated in FIG. 2, monitoring unit 204 may include frequency determination unit 206. Frequency determination unit 206 analyze the transaction data to determine the number of times a customer has performed each of the plurality of financial transactions monitored by monitoring unit 204. As one example, frequency determination unit 206 may analyze the financial transactions that were performed most frequently by the customer. For example, frequency determination unit 206 may analyze the financial transactions performed over the last six months to identify the transactions having the highest frequency of occurrence. As another example, frequency determination unit 206 may analyze the monitored predetermined number of previous financial transactions. For example, frequency determination unit 206 may analyze the last fifty financial transactions to identify the transactions having the highest frequency of occurrence. As a further example, frequency determination unit 206 may analyze the financial transactions monitored between the specified financial accounts. For example, frequency determination unit 206 may analyze fund transfer transactions from a first transferring account to a second receiving account to determine a most frequent transaction amount for the fund transfers.

The frequency of each transaction may be stored in a table of transaction frequencies 210 within database 208 of online banking system 220. In some examples, database 208 or table of transaction frequencies 210 may be stored within memory 224. Transactions stored within table of transaction frequencies 210 may be arranged according to a number of different methodologies. For example, the transactions may be ranked according to the frequency of occurrence of transferring and receiving accounts in the financial transaction, an amount of funds within the transaction, a particular date on which the transaction occurs, or other methodologies not expressly discussed herein. According to the techniques of the disclosure, when a customer accesses online banking system 220, application program interface (API) 212 may apply a second metric or methodology to the transaction information stored within database 208 to select one or more suggested transactions. For example, API 212 may select one or more of the most frequent transactions stored within table of transaction frequencies 210. User interface 226 may present these selected transactions to the customer as suggested transactions for the customer to perform. The customer may select and approve one or more of the suggested transactions, and online banking system 220 may then execute the approved transactions. In some examples, API 212 may automatically populate particular fields required to complete a suggested transaction, such as one or more accounts, an amount of funds, or a date on which to execute the transaction, thus reducing the amount of time required by the customer to complete the transaction.

In the example of FIG. 2, the second metric is a determination of the most frequently occurring transaction or transactions. However, many other methodologies may be used to identify a suggested transaction. For example, the second metric used to determine a suggested transaction may be a determination of the last or most recent transaction performed by the customer.

In this example, monitoring unit 204 may apply a first metric to select the financial transactions monitored over a predetermined period of time or a predetermined number of monitored financial transactions. Monitoring unit 204 may store and maintain this information in database 208. API 212 may apply a second metric, in this example, by selecting one or more of the most recently performed transactions from database 208. User interface 226 may present these selected transactions to the customer as suggested transactions for the customer to perform. The customer may select and approve one or more of the suggested transactions, and online banking system 220 may then execute the approved transactions. In some examples, API 212 may automatically populate particular fields required to complete a suggested transaction, such as one or more accounts, an amount of funds, or a date on which to execute the transaction, thus reducing the amount of time required by the customer to complete the transaction.

In some examples, the suggested financial transaction presented to the customer via user interface 226 includes a suggested transferring account, a suggested receiving account, and a suggested transaction amount. In this example, the customer may select to perform the suggested financial transaction and API 212, in turn, may automatically populate all the required information to perform the suggested financial transaction. In some examples, API 212 may provide the customer with a final opportunity to either approve the suggested transaction as is or edit the accounts or amount of the suggested transaction. In other examples, the suggested financial transaction presented to the customer via user interface 226 includes a suggested transferring account and a suggested receiving account. In this example, the customer may select to perform the suggested financial transaction and API 212 then prompts the customer to provide a transaction amount and final approval to perform the suggested transaction.

In some examples, if the customer declines to perform the suggested transaction, user interface 226 may direct the customer to the default "home" page of online banking system 220. The customer may then conduct a transaction of his choosing by selecting a transferring account, a receiving account, an amount of funds to be transferred, and a date to execute the transfer. In some examples, online banking system 220 may monitor new transactions performed during the session and update the table of the frequency of each transaction performed by the customer accordingly.

In some examples, online banking system 220 may include means for administrator access. In the example illustrated in FIG. 2, administrator access interface 214 may take the form of a command-line interface (CLI). In other examples, administrator access interface 214 may be a graphical user interface (GUI). Administrator access interface 214 may permit a user authorized to perform maintenance on online banking system, such as a manager or IT personnel, to adjust particular mechanics of online banking system 220. In some examples, such an authorized user may use administrative access interface 214 to adjust the number of records stored within table of transaction frequencies 210, the length of the time period over which values are stored within table of transaction frequencies 210, the methodology used to identify a transaction stored within table of transaction frequencies 210 as a favorite, and the like.

The architecture of online banking system 220 illustrated in FIG. 2 is shown for exemplary purposes only. The techniques as set forth in this disclosure may be implemented in the example online banking system 220 of FIG. 2, as well as other types of online banking systems not described specifically herein. For example, the second metric applied to determine a suggested transaction may be a determination of the most frequently occurring transaction, the last or most recent transaction performed by the customer, or some other methodology to identify a suggested transaction to present to the user. In other examples, database 208 may be a distributed database, or may be connected to online banking system 220 via a network. In further examples, the elements depicted in online banking system 220 may be implemented in software, hardware, or a combination of software and hardware. Nothing in this disclosure should be construed so as to limit the techniques of this disclosure to the example architecture illustrated by FIG. 2.

FIGS. 3-6 are tables illustrating an example plurality of financial transactions according to the techniques of this disclosure. For example, and with respect to FIGS. 1 and 2, FIGS. 3-6 depict how an example online banking system 220 may create a table of financial transactions and determine one or more frequently performed transactions. FIGS. 3-6 are provided as examples only, and nothing in this disclosure should be construed so as to limit the techniques of this disclosure to the example financial transactions illustrated by FIGS. 3-6. Specifically, the types of transferring and receiving accounts illustrated in FIGS. 3-6 are merely exemplary. The techniques of the disclosure may apply to any type of account, or combination of accounts, that a customer may possess with a financial institution. The examples described with respect to FIGS. 3-6 may include one account, multiple accounts, or no accounts of various types, such as checking accounts, savings accounts, brokerage accounts, certificate of deposit accounts, foreign currency exchange accounts, lines of credit or equity, retirement savings accounts, or loans.

FIG. 3 is a table illustrating an example plurality of financial transactions according to the techniques of the disclosure. For example, and with respect to FIGS. 1 and 2, table 300 may be maintained by online banking system 220 within table of transaction frequencies 210. However, in other examples, table 300 may be maintained by one or more separate computers or databases. Table 300 may include information about a plurality of financial transactions 302-350 executed by a customer. In some examples, table 300 may include information including the date each transaction was executed, the transferring account, the receiving account, and an amount transferred. In some examples, table 300 may maintain information about a plurality of financial transactions executed by a plurality of customers. In this example, table 300 may include information sufficient to identify the customer that performed each transaction, such as a customer-identifying number, an account number, or the Social Security number of the customer.

As discussed above, according to the techniques of the disclosure, online banking system 220 may monitor information about a plurality of financial transactions 302-350 performed by a customer. In some examples, online banking system 220 may store this information in the form of table of transaction frequencies 210 within database 208. In the example of FIG. 3, online banking system 220 has recorded that on Jan. 1, 2016, the customer transferred $75.00 from his checking account to his CD account 302; and on Jan. 5, 2016, and the customer transferred $1,000 from his checking account to his brokerage account 304. Further, online banking system 220 has recorded that the most recent transaction performed by the customer was a transfer of $1000 from his checking account to his brokerage account 350 on May 5, 2016. Thus, it may be seen that online banking system 220 may monitor information pertaining to a plurality of financial transactions performed by the customer.

In this example, online banking system 220 has stored information about several types of financial accounts between the dates of Jan. 1, 2016 to May 5, 2016. However, the techniques of this disclosure may be equally applied to arbitrary periods of time. For example, online banking system 220 may monitor information about financial transactions performed by a customer within the last week, month, year, or since the customer has opened the account. Further, in some examples, online banking system 220 may monitor information about a predetermined number of transactions. For example, online banking system 220 may monitor the last ten, hundred, or thousand transactions performed by a customer. Further, in some examples, online banking system may monitor a combination of a predetermined number of transactions that have occurred within a particular date. For example, online banking system 220 may monitor the greater of the last 100 transactions of a customer or the transactions performed by that customer in the last year.

FIG. 4 is a table illustrating an example plurality of financial transactions according to the techniques of the disclosure. In the example of FIG. 4, online banking system 220 may arrange the plurality of financial transactions depicted in FIG. 3 by transferring account and by receiving account. Thus, it may be seen that a customer may perform many financial transactions within a certain period, but the customer may perform several transactions much more frequently than others. For example, online banking system 220 may observe that, within the monitored time, the customer has transferred various funds from his checking account to his savings account (402-414). As another example, online banking system 220 may observe that, within the monitored time, the customer has transferred $1,000 from his checking account to his brokerage account five times. Accordingly, it may be seen that online banking system 220 may analyze the information about the plurality of financial transactions to determine the frequency of each transaction or type of transaction the customer has performed between certain from/to account combinations.

FIG. 5 is a table illustrating examples of frequent financial transactions according to the techniques of the disclosure. In the example of FIG. 5, online banking system 220 may count each of the plurality of financial transactions performed by the customer. In some examples, online banking system 220 may count the number of times the customer has transferred funds from a first account to a second account. In the example of FIG. 5, online banking system has determined that, within the monitored time period, the customer has transferred funds from his checking account to savings account seven times 502, while he has transferred funds from his checking account to his brokerage account five times 504 and transferred funds from his savings account to his CD account only once 512. Thus, it may be seen, that in the example of FIG. 5, the transaction having the highest frequency of occurrence made by the customer is a transfer of funds from his checking account to his savings account 502, while the second most frequently performed transaction made by the customer is a transfer of funds from his checking account to his brokerage account 504.

According to the techniques of the disclosure, when the customer returns to online banking system 220, the system may suggest that the customer perform one or more of his most frequently performed transactions. The transaction having the highest frequency of occurrence may be determined using a number of different methodologies. In one example, online banking system 220 may suggest that the customer perform a transfer of funds from his checking account to his savings account. In this example, online banking system 220 may automatically select checking account 102 of customer as the transferring account and the savings account 104 as the receiving account. Online banking system 220 may query the customer to provide an amount of funds to be transferred, and an authorization to complete the transfer.

In another example, online banking system 220 may additionally suggest that the customer perform a transfer of funds from his checking account 102 to his brokerage account 106. In this example, online banking system 220 may automatically select the checking account 102 of the customer as the transferring account and the brokerage account 106 of the customer as the receiving account. In some examples, online banking system 220 may query the customer to provide an amount of funds to be transferred, and an authorization to complete the transfer to his brokerage account 106. In other examples, online banking system 220 may automatically select a most frequent transaction amount, e.g., $1,000, between checking account 102 and brokerage account 106, and only query the customer to provide an authorization to complete the transaction. In some examples, after the transaction has executed, online banking system 220 may provide the customer with confirmation that the transaction executed successfully, or a receipt of the transaction.

According to the techniques of the disclosure, online banking system 220 may determine the transactions most frequently performed by the customer, suggest that the customer perform those transactions, and automatically complete at least a portion of the steps required to execute the suggested transactions. Such a system may reduce the amount of time required for a customer to perform his most frequently performed financial transactions. Further, such a system may provide a customer with a more personalized experience than conventional online banking systems.

FIG. 6 is a table illustrating examples of frequent financial transactions according to the techniques of the disclosure. As discussed above, online banking system 220 may determine the transaction or transactions having the highest frequency of occurrence by a number of different methodologies and criteria. For example, one such method may be to determine the transaction having the highest frequency of occurrence by determining the two accounts most frequently used by the customer to conduct transactions. Another example method may be to determine the most frequent transaction by determining a transaction having the most frequent amount of funds transferred.

As an illustration, in the example of FIG. 5, online banking system 220 may determine the financial transactions having the highest frequency of occurrence by counting the number of times a customer has transferred funds from a first account to a second account. However, according to the techniques of the disclosure, online banking system 220 may determine the financial transaction having the highest frequency of occurrence in many other ways. For example, online banking system 120 may monitor the amount of each financial transaction, and suggest that the customer transfer an amount of funds equal to the amount the customer transfers most frequently. In other examples, online banking system 220 may determine the most frequently used pair of transferring and receiving accounts, and then determine the amount of funds most frequently transferred between those accounts. In this example, online banking system 220 may provide the suggested transferring and receiving accounts, as well as a suggested amount of funds. Thus, in this example, online banking system 120 may require only approval from the customer to complete the transaction.

As a further example, with respect to FIG. 6, online banking system 220 may count the number of times a specific amount was transferred from a first account to a second account. In the example of FIG. 6, online banking system 220 has determined that, within the monitored time period, the customer has transferred $1,000 from his checking account to his brokerage account five times 602, while, within the monitored time period, the customer has transferred $1,250 from his checking account to a line of credit only once 612. Thus, in the example of FIG. 6, online banking system 220 may determine that the transaction having the highest frequency of occurrence performed by the customer is a transfer of $1,000 from his checking account to his brokerage account 602. According to the techniques of the disclosure, when the customer returns to online banking system 220 through user interface 226, the system may suggest that the customer perform a transfer of $1,000 from his checking account 102 to his brokerage account 106. In one example, online banking system 220 may require only that the customer approve the transaction before completing the transaction. In other examples, user interface 226 may give the customer the opportunity to edit the transaction amount before completing the transaction. In some examples, API 212 may automatically complete one or more of the fields of the transaction before completing the transaction. In some examples, after the transaction has executed, user interface 226 may provide the customer with confirmation that the transaction executed successfully, or a receipt of the transaction.

According to the techniques of the disclosure, online banking system 120 may determine the transactions most frequently performed by the customer, suggest that the customer perform those transactions, and automatically complete at least a portion of the steps required to execute the transaction. Such a system may reduce the amount of time required for a customer to perform his most frequently performed financial transactions. Further, such a system may provide a customer with a more personalized experience than conventional online banking systems.

Returning to FIG. 2, according to the techniques of the disclosure, user interface 226 of online banking system 220 may provide suggestions or reminders to a customer to complete a frequently performed transaction if online banking system 220 has determined that the customer frequently performs a transaction of that type on a particular periodic cycle, but has not yet completed a transaction of that type. For example, monitoring unit 204 may monitor the past financial transactions executed by the customer to determine whether the customer frequently performs a particular type of financial transaction on a particular date each month. In the example of FIG. 3, frequency determination unit 206 may observe that the customer has transferred $1,000 from his checking account to his brokerage account on Jan. 5, 2016, Feb. 5, 2016, Mar. 5, 2016, Apr. 5, 2016, and May 5, 2016, as illustrated by rows 304, 318, 330, 340, and 350. Thus, online banking system 220 may determine that the customer performs this type of transaction (e.g., a transfer of $1,000 from his checking account to his brokerage account) on the 5th of each month. In one example, as the current date approaches Jun. 5, 2016, if the customer has not yet transferred $1,000 from his checking account to his brokerage account, user interface 226 may present a reminder to the customer asking him if he would like to conduct such a transaction.

In this example, user interface 226 may automatically select checking account 102 as the transferring account, brokerage account 106 as the receiving account, and $1,000 as the amount to be transferred. In this example, user interface 226 may prompt the customer only for authorization to complete the transfer. In some examples, after the transaction has executed, user interface 226 may provide the customer with confirmation that the transaction executed successfully, or a receipt of the transaction.

In the foregoing example, frequency determination unit 206 determined that the customer performed a particular type of transaction once per month. However, the techniques of this disclosure may be broadly applied to any periodic or aperiodic pattern, metric, or methodology that it may detect. For example, frequency determination unit 206 may determine that a customer frequently performs a particular financial transaction on a daily, weekly, biweekly, monthly, bimonthly, quarterly, semiannual, or annual basis. In other examples, frequency determination unit 206 may determine that a customer frequently performs a particular financial transaction when the balance of the receiving account falls below a particular threshold or when the balance of the transferring account exceeds a particular threshold. In other examples, frequency determination unit 206 may determine that a customer frequently performs a first financial transaction of a first type immediately after performing a second financial transaction of a second type. In other examples, frequency determination unit 206 may determine that a customer frequently performs a first financial transaction after depositing funds in a particular account, or after receiving funds from a third-party source.

Thus, it may be seen that an online banking system according to the techniques of the disclosure may determine the transactions having the highest frequency of occurrence performed by the customer or the transactions most recently performed by the customer, suggest that the customer perform those transactions, and automatically complete at least a portion of the steps required to execute the transaction. Thus, such a system may reduce the amount of time required for a customer to perform his most frequently performed financial transactions. Further, such a system may provide a customer with a more personalized experience than other online banking systems. Further, it may be seen that an online banking system according to the techniques of the disclosure may discover transactions frequently performed on a particular periodic cycle and remind the customer to perform these transactions. Thus, such a system may assist a customer in remembering to pay important bills and more effectively manage finances.

Figure 7A:
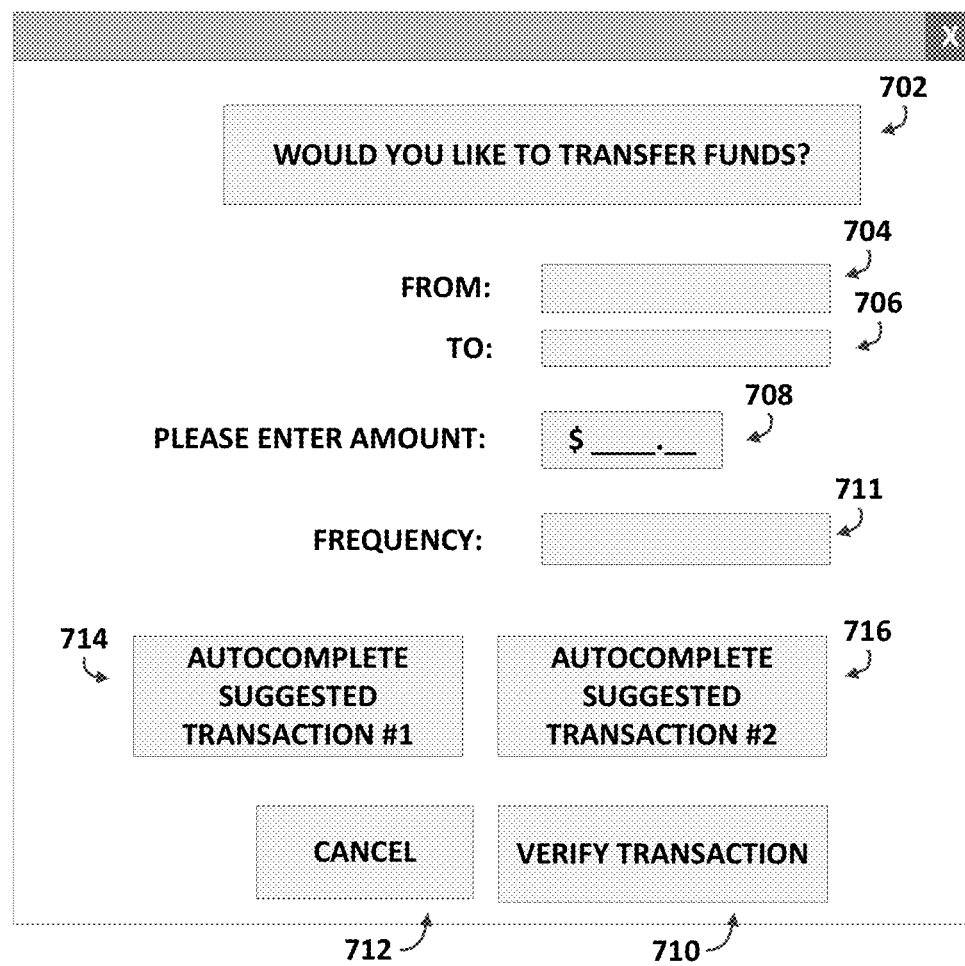
FIG. 7A is a conceptual diagram illustrating an example prompt to select a suggested transaction according to the techniques of the disclosure.
Figure 7B:
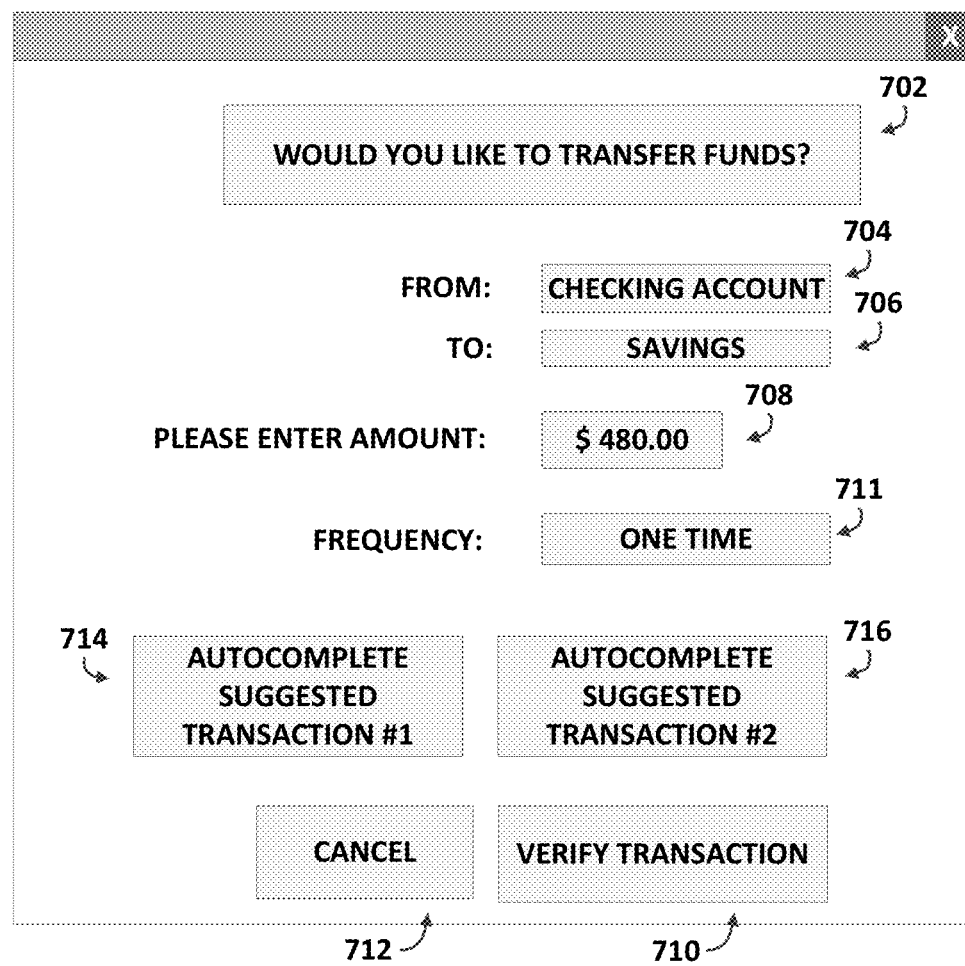
FIG. 7B is a conceptual diagram illustrating an example prompt to perform a selected suggested transaction according to the techniques of the disclosure.

FIGS. 7A and 7B are conceptual diagrams illustrating an example prompt in user interface 126 to select and perform a suggested transaction according to the techniques of the disclosure. For example, and with respect to FIGS. 1-3, online banking system 220 may determine that the customer most frequently performs a transfer of funds from his checking account 102 to the Bill Pay service 116.

In the illustrated example of FIG. 7A, when the customer accesses online banking service 120 through user interface 126, online banking service 120 may generate a prompt 700 containing fillable fields to request a transaction. In some examples, prompt 700 may provide a heading 702 to deliver a message to the customer. Prompt 700 may leave various fields empty, such as the transferring account selection field 704, the receiving account selection field 706, the funds selection field 708, and the transaction frequency field 711. In some examples, the customer may click the transferring account selection 704 or receiving account section 706 to receive a drop-down menu that may allow the customer to select a different transferring or receiving account for the transaction, respectively. In this example, the customer may specify an amount of funds to be transferred, by entering an amount of funds into funds selection field 708. In some examples, the customer may select a frequency for the transaction 711. In some examples, the customer may click a drop-down menu in frequency selection box 711, and may schedule a frequency for the transaction, such as "one-time," "weekly," "bi-weekly," or "monthly."

In accordance with the techniques described in this disclosure, prompt 700 may further include suggested transaction selection buttons 714 and 716, which allow a customer to select one or more suggested financial transactions to complete. If the customer clicks one of suggested transaction selection buttons 714 and 716, online banking system 220 may automatically populate values for one or more of the transferring account selection field 704, the receiving account selection field 706, the funds selection field 708, and the transaction frequency field 711.

Regardless of whether the customer manually fills out the fields to request a transaction or selects one of the suggested transactions, seeks approval from the customer before performing the transactions. In some examples, the customer may decline the transaction and continue to the "home" page of the online banking service by clicking "Cancel" button 712. In some examples, the customer may click the "Verify Transaction" button 710 to proceed to another screen, wherein the details of the transaction may be presented to the customer, as described in more detail with respect to prompt 800 from FIG. 8. The customer may then review the details of the transaction and authorize the transaction to execute.

In the illustrated example of FIG. 7B, a customer has selected the autocomplete suggested transaction button 714. Prompt 700 has automatically selected checking account 102 as the transferring account (e.g., the "from" account"), as shown in transferring account selection 704 and savings account 104 as the receiving account (e.g., the "to" account"), as shown in receiving account selection 706. Prompt 700 may additionally enter a suggested amount of funds to be transferred in funds selection 708, while allowing the customer to edit the suggested amount so that he may enter an alternate amount of funds to transfer. Prompt 700 may further suggest that the transaction be performed a single time, as indicated by transaction frequency field 711. In some examples, the transaction may execute automatically, while in other examples, user interface 226 may allow the customer to schedule a time to conduct the transaction.

While in this example, user interface 226 has presented multiple suggested transactions to the customer, in other examples, user interface 226 may present a single suggested transaction. In other examples, user interface 226 may present a separate prompt for each suggested financial transaction.

Further, in this example, online banking system 120 provides a suggested financial transaction to the customer through a prompt created by user interface 126. However, according to the techniques of the disclosure, online banking system 120 may provide the suggested financial transaction to the customer through a variety of ways. For example, online banking system 120 may provide the suggested transaction to the customer by text or SMS message, by email, by an electronic instant messaging service, or by a secure messaging service implemented by online banking system 120.

Thus, it may be seen that an online banking system according to the techniques of the disclosure may determine the transactions having the highest frequency of occurrence performed by the customer or the transactions most recently performed by the customer, suggest that the customer perform those transactions, and automatically complete at least a portion of the steps required to execute the transaction. Thus, such a system may reduce the amount of time required for a customer to perform his most frequently performed financial transactions. Further, such a system may provide a customer with a more personalized experience than other online banking systems.

Figure 8:
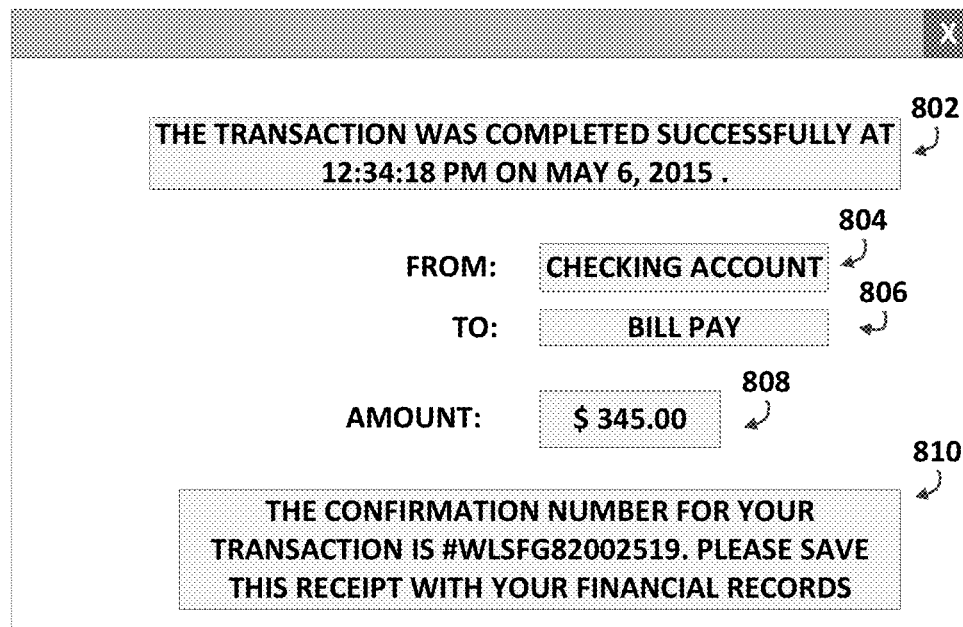
FIG. 8 is a conceptual diagram illustrating an example confirmation prompt of a performed transaction according to the techniques of the disclosure.

FIG. 8 is a conceptual diagram illustrating an example confirmation prompt of a performed transaction according to the techniques of the disclosure. For example, and with respect to FIGS. 1-3 and 6, the customer may verify the details of a suggested financial transaction and authorize it to execute through user interface 226. Online banking system 220 may receive the authorization to complete the suggested transaction from the customer through user interface 226. Online banking system 220 may execute the transaction, and provide the customer with a popup window prompt 800 indicating confirmation of the transaction and providing a receipt to the customer. Window prompt 800 may inform the customer that the transaction was successfully completed, as shown by message 802. In some examples, window prompt 800 may also inform the customer of the time and date that the transaction was completed. In further examples, window prompt 800 may identify the transferring account 804 (e.g., the "from" account), the receiving account 806 (e.g., the "to" account), and the amount transferred 808. In further examples, window prompt 800 may indicate the remaining balance of the transferring account and the new balance of the receiving account. In some examples, window prompt 800 may provide the customer with a confirmation number 810 that the customer may use to identify the transaction, should the customer require technical support from the financial institution.

Figure 9:
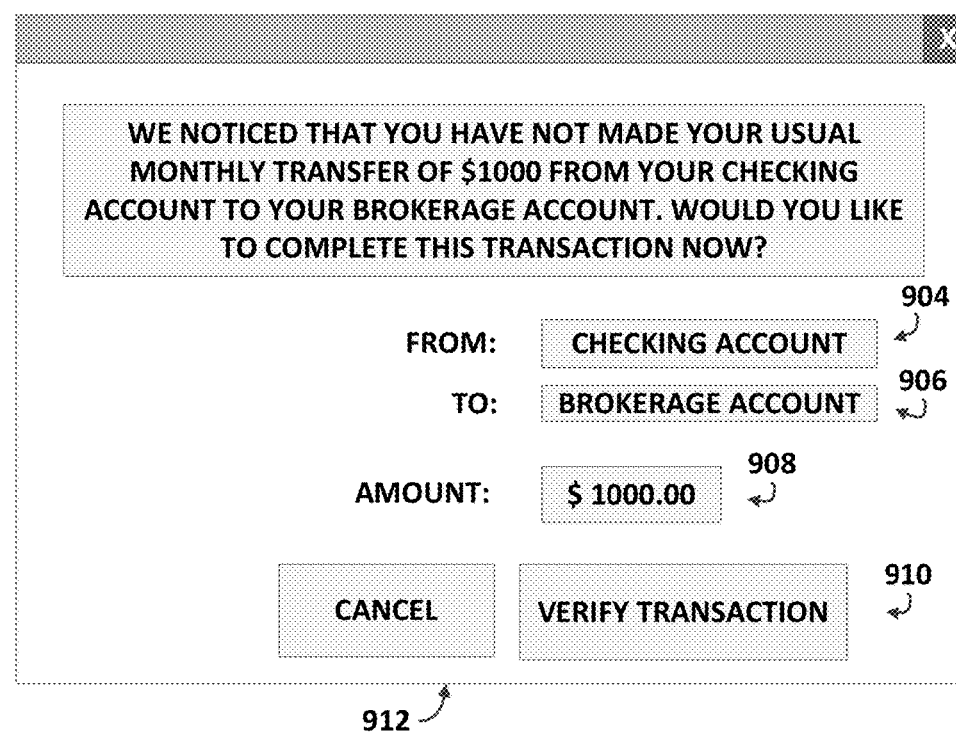
FIG. 9 is a conceptual diagram illustrating an example prompt reminding a customer to perform a transaction that the customer has previously performed.

FIG. 9 is a conceptual diagram illustrating an example prompt reminding a customer to perform a transaction that the customer has previously performed. For example, and with respect to FIGS. 1-3, online banking system 220 may determine that a customer frequently performs a particular transaction on a particular date. In this example, frequency determination unit 206 of online banking system 220 has determined that the customer typically transfers $1,000 from his checking account 102 to his brokerage account 106 on the 5th of every month. Monitoring unit 204 may monitor the financial transactions of the customer to determine whether this transaction has been made for the current period. In this example, as the date approaches June 5, if the customer has not yet transferred $1,000 from his checking account 102 to his brokerage account 106, user interface 226 may present a prompt 900 to the customer to remind him that the transaction has not yet been completed.

In some examples, prompt 900 may include a heading 902 that notifies the customer that he has not yet completed a transaction that he frequently performs by a particular date. In some examples, the heading may notify the customer of the date by which he frequently conducts the transaction. In some examples, the transaction may execute automatically, while in other examples, user interface 226 may allow the customer to schedule a time to conduct the transaction. In some examples, the customer may click the "Verify Transaction" button 910 to proceed to a new screen, wherein the details of the transaction may be summarized for the customer, as described in more detail with respect to prompt 800 from FIG. 8. The customer may review the details of the transaction and authorize it to execute.

In some examples, the window prompt may automatically select checking account 102 as the transferring account 904 (e.g., the "from" account) and brokerage account 106 as the receiving account 906 (e.g., the "to" account). In some examples, the customer may click the transferring account 904 or receiving account 906 button to receive a drop-down menu that may allow the customer to select a different transferring or receiving account for the transaction, respectively. In this example, online banking system 220 has automatically suggested that $1,000 be transferred, as shown in transaction funds box 908. In other examples, user interface 226 may prompt the customer to specify an amount of funds to be transferred and allow the customer to enter a desired amount of funds into box 808. In other examples, user interface 226 may present a suggested amount of funds to be transferred, while allowing the customer to edit the suggested amount so that he may enter a desired amount of funds to transfer. In some examples, the customer may decline the transaction and continue to the "home" page of the online banking service by clicking "Cancel" button 912.

Thus, it may be seen that an online banking system according to the techniques of the disclosure may determine the transactions having the highest frequency of occurrence performed by the customer or the transactions most recently performed by the customer, suggest that the customer perform those transactions, and automatically complete at least a portion of the steps required to execute the transaction. Thus, such a system may reduce the amount of time required for a customer to perform his most frequently performed financial transactions. Further, such a system may provide a customer with a more personalized experience than other online banking systems. Further, it may be seen that an online banking system according to the techniques of the disclosure may discover transactions frequently performed on a particular date and remind the customer to perform these transactions. Thus, such a system may assist a customer in remembering to pay important bills and more effectively manage his finances.

Figure 10:
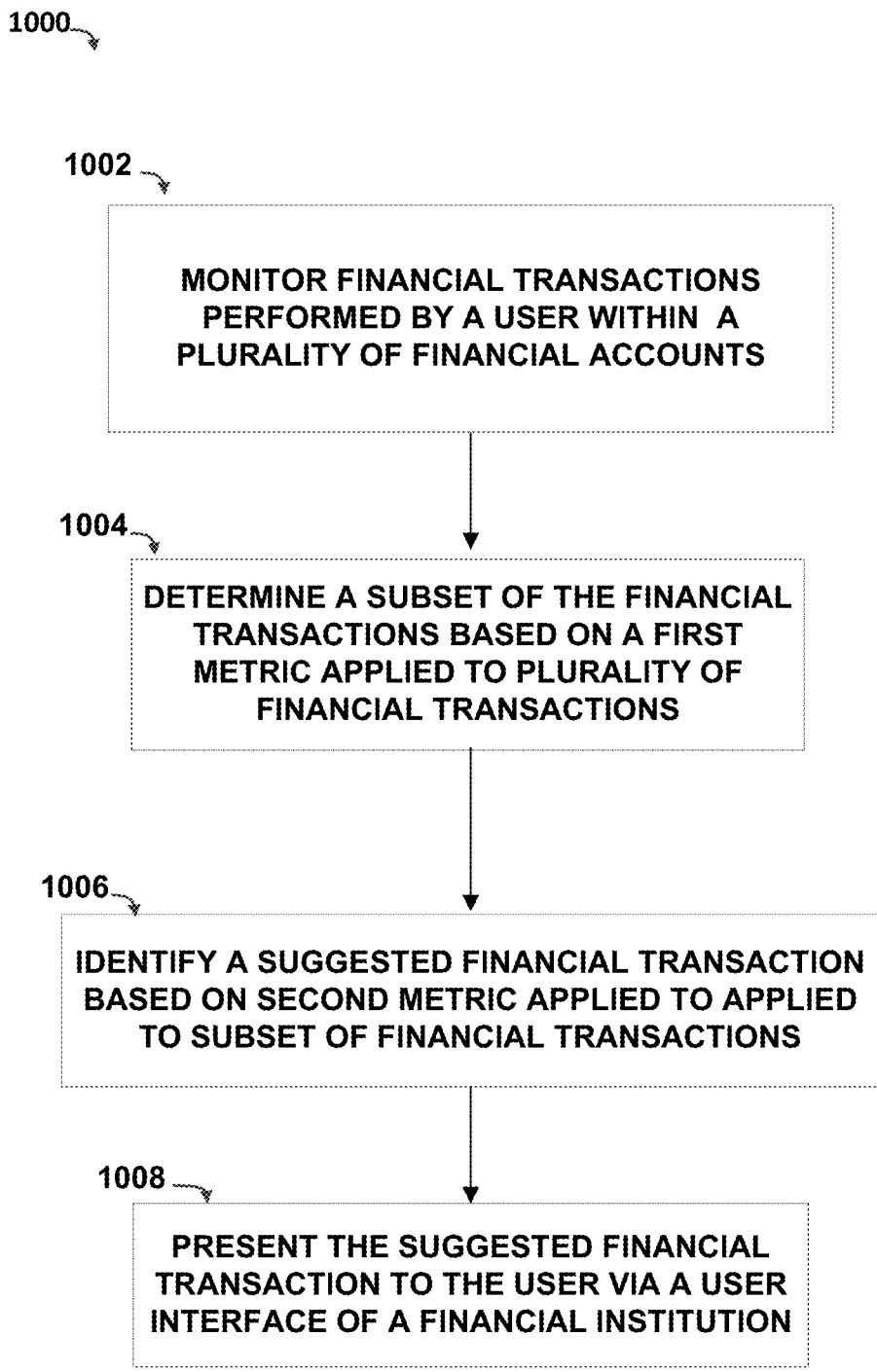
FIG. 10 is a flowchart illustrating an example operation of determining behavior based financial transaction favorites according to the techniques of the disclosure.

FIG. 10 is a flowchart illustrating an example operation of determining behavior based financial transaction favorites according to the techniques of the disclosure. For example, and with respect to FIG. 2, FIG. 10 depicts an example operation wherein an online banking system 220 may provide a customer with suggestions for frequently performed transactions.

In some examples, monitoring unit 204 of online banking system 220 may monitor a plurality of financial transactions performed by a customer within a plurality of financial accounts (1002). These accounts may be accounts that the customer possesses with a financial institution, such as accounts 102-114 of FIG. 1. The monitoring unit 204 may create a subset of the plurality of financial transactions according to a first metric or methodology applied to the plurality of financial transactions (1004). For example, the first metric applied to the plurality of transactions may be a determination of a predetermined number of financial transactions, the financial transactions occurring within a predetermined time period, or the financial transactions between particular accounts. Information regarding the subset may be stored in database 208. Online banking system 220 may then identify a suggested transaction based on second metric or methodology applied to the subset of the plurality of financial transactions (1006). In one example, the second metric applied to the subset of the plurality of financial transactions may be a determination of the most frequent financial transactions, and the resulting information may be stored as a table of transaction frequencies 210 within database 208. Frequency determination unit 206 within monitoring unit 204 of online banking system 220 may determine a frequency of occurrence of each of the plurality of financial transactions, and update the table of transaction frequencies 210 accordingly. In another example, the second metric may be a determination of the last or most recent transactions, which may be stored within database 208. API 212 may identify at least one suggested financial transaction based on the frequency of occurrence of each of the plurality of financial transactions stored within table of transaction frequencies 210. User interface 226 may receive the identified suggested financial transactions and present the financial transactions to the customer (1008).

In some examples, the customer may select one or more of the suggested financial transactions and approve their execution. The customer may submit his approval by clicking a button of user interface 226, such as button 710 of FIGS. 7A and 7B, or button 910 of FIG. 9. Once online banking system 220 receives approval from the customer, it may execute each approved transaction. Online banking system 220 may provide to the customer, through user interface 226, a receipt for each approved transaction that has successfully executed. One example of such a receipt is depicted in FIG. 8. In other examples, online banking system 220 may provide a receipt of the transaction to the customer through an email, SMS message, automatically generated phone call, or postal correspondence.

In some examples, online banking system 220 may apply a first metric to the plurality of financial transactions so as to limit the amount of information analyzed by monitoring unit 204 and stored within database 208 to a subset of the plurality of financial transactions. For example, database 208 may store only those financial transactions that occur within a predetermined time (e.g., the last week, month, quarter, or year). As another example, database 208 may store information pertaining to a predetermined number of financial transactions, specific financial accounts, or the most recent financial transactions.

In some examples, online banking system 220 may apply a second metric to the subset of the plurality of financial transactions. For example, online banking system 220 may determine the frequency of occurrence of each of the plurality of financial transactions. In other examples, online banking system 220 may analyze financial transactions performed between a first financial account and a second financial account. For example, frequency determination unit 206 may analyze a plurality of financial transactions performed between checking account 102 and savings account 104 to determine the most frequent amount of funds transferred. Online banking system 220 may use this analysis to provide a suggested amount of funds for use in a suggested transaction.

In some examples, online banking system 220 may identify the at least one suggested financial transaction by identifying at least one of the plurality of financial transactions having a highest frequency of occurrence. For example, frequency determination unit 206 may determine that a particular transaction conducted by the customer is the transaction most frequently conducted. In other examples, online banking system 220 may determine which transaction was last or most recently performed by the customer. Online banking system 220 may therefore select one or more of these transactions to suggest to the customer.

Online banking system 220 may identify different types of suggested financial transactions according to different metrics and methodologies used to gather data on the transactions of the customer. In one example, monitoring unit 204 may analyze both the receiving and transferring accounts used in financial transactions, as well as the amount of funds transferred in these transactions. In this example, online banking system 220 may use this information to provide a suggested financial transaction that may include a suggested transferring account, a suggested receiving account, and a suggested transaction amount. In another example, monitoring unit 204 may analyze only the receiving and transferring accounts used in financial transactions, while not monitoring the amount of funds transferred. In this example, online banking system 220 may use this information to provide a suggested financial transaction that may include a suggested transferring account and a suggested receiving account, but may not include a suggested transaction amount.

In some examples, online banking system 226 may receive from the customer via user interface 226 selection of the at least one suggested financial transaction. Online banking system 226 may use API 212 to automatically populate one or more data fields in user interface 226 to complete the at least one suggested financial transaction. Online banking system 226 may perform the at least one suggested financial transaction based on the one or more data fields.

Thus, it may be seen that a system according to the techniques of the disclosure may assist a customer in quickly completing those transactions having the highest frequency of occurrence executed by the customer or most recently performed by the customer. Thus, such a system may reduce the amount of time required for a customer to perform his most frequently performed financial transactions. Further, such a system may provide a customer with a more personalized experience than other online banking systems.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
monitoring, by one or more processors of a computer system, a plurality of financial transactions performed by a customer within a plurality of financial accounts;
determining, by the one or more processors, a subset of the plurality of financial transactions based on a first metric applied to the plurality of financial transactions;
identifying, by the one or more processors, at least one suggested financial transaction based on a second metric applied to the subset of the plurality of financial transactions, wherein the at least one suggested financial transaction comprises one or more parameters and a suggested transaction amount;
determining, by the one or more processors, whether the at least one suggested financial transaction has been performed within a predetermined time period;
based on the at least one suggested financial transaction not being performed within the predetermined time period, generating, by the one or more processors, a reminder to perform the at least one suggest financial transaction;
presenting, by the one or more processors, the reminder to the customer via a user interface of the computer system; and
performing, by the one or more processors and in response to an input received from the customer via the user interface, the at least one suggested financial transaction.

2. The method of claim 1, wherein the first metric applied to the plurality of financial transactions comprises at least one of a predetermined period of time, a predetermined number of financial transactions, or specific financial accounts.

3. The method of claim 1, wherein the second metric applied to the subset of the plurality of financial transactions comprises one of a most frequently occurring financial transaction or a most recently performed financial transaction.

4. The method of claim 1, wherein identifying the at least one suggested financial transaction comprises:
determining a frequency of occurrence of each of the subset of the plurality of financial transactions; and
identifying the at least one suggested financial transaction as a most frequently occurring financial transaction of the subset of the plurality of financial transactions.

5. The method of claim 1, wherein identifying the at least one suggested financial transaction comprises identifying the at least one suggested financial transaction as a most recently performed financial transaction of the subset of the plurality of financial transactions.

6. The method of claim 1, wherein the suggested financial transaction comprises:
a suggested transferring account; and
a suggested receiving account.

7. The method of claim 1,
wherein the suggested financial transaction comprises:
a suggested transferring account; and
a suggested receiving account, and
wherein the input received from the customer comprises a transaction amount.

8. The method of claim 1, further comprising:
receiving, by the one or more processors and from the customer via the user interface, selection of the at least one suggested financial transaction;
automatically populating, by the one or more processors, one or more data fields in the user interface for the at least one suggested financial transaction; and
performing, by the one or more processors, the at least one suggested financial transaction based on the one or more data fields.

9. A computer system comprising:
a memory; and
one or more processors in communication with the memory, wherein the one or more processors comprise circuitry configured to:
monitor a plurality of financial transactions performed by a customer within a plurality of financial accounts;
determine a subset of the plurality of financial transactions based on a first metric applied to the plurality of financial transactions;
identify at least one suggested financial transaction based on a second metric applied to the subset of the plurality of financial transactions, wherein the at least one suggested financial transaction comprises one or more parameters and a suggested transaction amount;
determine whether the at least one suggested financial transaction has been performed within a predetermined time period;
based on the at least one suggested financial transaction not being performed within the predetermined time period, a reminder to perform the at least one suggest financial transaction;
present the reminder to the customer via a user interface of the computer system; and
perform, in response to an input received from the customer via the user interface, the at least one suggested financial transaction.

10. The computer system of claim 9, wherein the first metric applied to the plurality of financial transactions comprises at least one of a predetermined period of time, a predetermined number of financial transactions, or specific financial accounts.

11. The computer system of claim 9, wherein the second metric applied to the subset of the plurality of financial transactions comprises one of a most frequently occurring financial transaction or a most recently performed financial transaction.

12. The computer system of claim 9, wherein, to identify the at least one suggested financial transaction, the one or more processors are further configured to:
determine a frequency of occurrence of each of the subset of the plurality of financial transactions; and
identify the at least one suggested financial transaction as a most frequently occurring financial transaction of the subset of the plurality of financial transactions.

13. The computer system of claim 9, wherein, to identify the at least one suggested financial transaction, the one or more processors are further configured to identify the at least one suggested financial transaction as a most recently performed financial transaction of the subset of the plurality of financial transactions.

14. The computer system of claim 9, wherein the suggested financial transaction comprises:
a suggested transferring account; and
a suggested receiving account.

15. The computer system of claim 9,
wherein the suggested financial transaction comprises:
a suggested transferring account; and
a suggested receiving account, and wherein the input received from the customer comprises a transaction amount.

16. The computer system of claim 9, wherein the one or more processors are further configured to:
   receive, from the customer via the user interface, selection of the at least one suggested financial transaction;
   automatically populate one or more data fields in the user interface for the at least one suggested financial transaction; and
   perform the at least one suggested financial transaction based on the one or more data fields.

17. A non-transitory computer-readable medium comprising instructions, that, when executed, cause one or more processors to:
   monitor a plurality of financial transactions performed by a customer within a plurality of financial accounts;
   determine a subset of the plurality of financial transactions based on a first metric applied to the plurality of financial transactions;
   identify at least one suggested financial transaction based on a second metric applied to the subset of the plurality of financial transactions, wherein the at least one suggested financial transaction comprises one or more parameters and a suggested transaction amount;
   determine whether the at least one suggested financial transaction has been performed within a predetermined time period;
   based on the at least one suggested financial transaction not being performed within the predetermined time period, a reminder to perform the at least one suggest financial transaction;
   present the reminder to the customer via a user interface; and
   perform, in response to an input received from the customer via the user interface, the at least one suggested financial transaction.

18. The computer-readable medium of claim 17, wherein the first metric applied to the plurality of financial transactions comprises at least one of a predetermined period of time, a predetermined number of financial transactions, or specific financial accounts.

19. The computer-readable medium of claim 17, wherein the second metric applied to the subset of the plurality of financial transactions comprises one of a most frequently occurring financial transaction or a most recently performed financial transaction.

20. The computer-readable medium of claim 17, wherein, to identify the at least one suggested financial transaction, the one or more processors are further configured to:
   determine a frequency of occurrence of each of the subset of the plurality of financial transactions; and
   identify the at least one suggested financial transaction as a most frequently occurring financial transaction of the subset of the plurality of financial transactions.

\* \* \* \* \*